United States Patent
Sugioka et al.

(10) Patent No.: US 10,362,068 B2
(45) Date of Patent: Jul. 23, 2019

(54) SYSTEM AND METHOD FOR SCHEDULING A VIDEO CONFERENCE IN AN AUTONOMOUS VEHICLE

(71) Applicant: VOLVO CAR CORPORATION, Gothenburg (SE)

(72) Inventors: Ichiro Sugioka, Newbury Park, CA (US); Matthew Lawler, Camarillo, CA (US); Kari Kauppi, Ventura, CA (US); Aric Dromi, Lerum (SE); Nick Sakellariou, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 192 days.

(21) Appl. No.: 14/987,923

(22) Filed: Jan. 5, 2016

(65) Prior Publication Data

US 2016/0205146 A1 Jul. 14, 2016

(30) Foreign Application Priority Data

Jan. 12, 2015 (EP) .................................... 15150722

(51) Int. Cl.

| | |
|---|---|
| *G06F 15/16* | (2006.01) |
| *H04L 29/06* | (2006.01) |
| *G05D 1/00* | (2006.01) |
| *G05D 1/02* | (2006.01) |
| *H04L 29/08* | (2006.01) |
| *H04N 21/414* | (2011.01) |

(Continued)

(52) U.S. Cl.
CPC ....... *H04L 65/1066* (2013.01); *G05D 1/0088* (2013.01); *G05D 1/0291* (2013.01); *H04L 65/403* (2013.01); *H04L 67/12* (2013.01); *H04N 21/41422* (2013.01); *H04N 21/4788* (2013.01); *H04N 21/6181* (2013.01)

(58) Field of Classification Search
CPC ... H04L 65/1066; H04L 65/403; H04L 67/12; G05D 1/0088; G05D 1/0291; H04N 21/41422; H04N 21/4788; H04N 21/6181; B60W 50/14; G04D 1/00
See application file for complete search history.

(56) References Cited

U.S. PATENT DOCUMENTS

| | | | |
|---|---|---|---|
| 2009/0112671 A1* | 4/2009 | Grodum | G06F 19/327 705/7.19 |
| 2011/0167460 A1 | 7/2011 | Tranchina | |

(Continued)

FOREIGN PATENT DOCUMENTS

CN 104076766 10/2014

OTHER PUBLICATIONS

Extended European Search Report for European Application No. EP 15150722.5, Completed by the European Patent Office, dated Mar. 25, 2015, 7 Pages.

(Continued)

*Primary Examiner* — Ryan J Jakovac
(74) *Attorney, Agent, or Firm* — Brooks Kushman P.C.

(57) ABSTRACT

A system, a multi-user scheduling unit comprised in the system, and corresponding methods are described for scheduling a video conference call for at least one autonomous vehicle. The system provides a means of scheduling such a call for various participants while minimizing driver interaction or need for attention while a vehicle is in a manual driving mode.

20 Claims, 7 Drawing Sheets

(51) Int. Cl.
*H04N 21/4788* (2011.01)
*H04N 21/61* (2011.01)

(56) References Cited

U.S. PATENT DOCUMENTS

| | | | | |
|---|---|---|---|---|
| 2013/0145482 A1* | 6/2013 | Ricci | ............... | H04W 4/90 |
| | | | | 726/28 |
| 2015/0105960 A1* | 4/2015 | Pilutti | ............... | B60W 50/14 |
| | | | | 701/23 |
| 2015/0314780 A1* | 11/2015 | Stenneth | ............... | B60W 30/00 |
| | | | | 701/23 |
| 2017/0075358 A1* | 3/2017 | Zhang | ............... | G06Q 10/06 |

OTHER PUBLICATIONS

Leeuwne et al. British Telecommunications Engineering Jul. 1, 2003, vol. 2, No. 3, p. 77-82, "Broadband Wireless Communication in Vehicles".

Poltrock et al. Proceedings of the 38th Hawaii International Conference on System Sciences, Jan. 3, 2005, 8 Pages, XP010762464, "Videoconferencing: Recent Experiments and Reassessment".

* cited by examiner

SYSTEM AND METHOD FOR SCHEDULING A VIDEO CONFERENCE IN AN AUTONOMOUS VEHICLE

CROSS-REFERENCE TO RELATED APPLICATIONS

This application claims foreign priority benefits under 35 U.S.C. § 119(a)-(d) to European patent application number EP 15150722.5, filed Jan. 12, 2015, which is incorporated by reference in its entirety.

TECHNICAL FIELD

Example embodiments presented herein are directed towards a system and corresponding method for scheduling a video conference call in an autonomous vehicle.

BACKGROUND

An autonomous vehicle is one that is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities that may not be possible while the vehicle is in a manual driving mode. Examples of such activities are sleeping, working or using multimedia applications.

SUMMARY

It is likely that the entire driving route will not involve autonomous driving. Thus, if a driver and/or passenger of a vehicle will want to engage in activities that are otherwise not safely accomplished during a manual driving mode, such activities should be planned accordingly. An example of such an activity is the participation in a video conference call.

Therefore, at least one object of the example embodiments described herein is to provide a system for scheduling a video conference call for at least one autonomous vehicle. An example advantage of such a system is that the video conference call may be scheduled for multiple participants with minimum distraction to the driver while the vehicle is in a manual driving mode.

Accordingly, the example embodiments are directed towards a system for scheduling a video conference call for at least one autonomous vehicle. The system comprises a plurality of vehicle scheduling units, each of the plurality of vehicle scheduling units being comprised in a respective vehicle. The plurality of vehicle scheduling units are configured to estimate an autonomous driving time in which the respective vehicle will be in an autonomous driving mode. The plurality of vehicle scheduling units are further configured to send the autonomous driving time to a multi-user scheduling unit. The multi-user scheduling unit is configured to receive the autonomous driving time from the plurality of vehicle scheduling units and store the received autonomous driving time in a central memory unit. The multi-user scheduling unit is further configured to determine a time for a video conference for at least one vehicle associated with a respective vehicle scheduling unit based on a calling request and any information related to participants for the video conference call which are situated in respective vehicles, wherein the information retrieved from the central memory unit.

It should be appreciated that the calling request may be an incoming or an outgoing request from any of the participants of the video conference call. It should be appreciated that the calling request may also be a scheduled video call on one of the participant's calendar. It should further be appreciated that not all participants need to be situated in a vehicle, for example, at least one participant may be situated in an office or home setting. It should also be appreciated that the information related to the participants may comprise the estimated autonomous driving times and any scheduled calls of the participants.

This example embodiment has the advantage of reducing the amount of driver interaction needed in the planning, rescheduling, rejection or acceptance of such a video conference call. Thus, driver distraction is minimized. The minimization of the driver distraction is especially beneficial when the vehicle is in a manual driving mode as the driver's attention should be directed towards the operation of the vehicle.

Some of the example embodiments are directed towards a multi-user scheduling unit for scheduling a video conference call for at least one autonomous vehicle. The multi-user scheduling unit comprises a receiving unit configured to receive, from a plurality of vehicle scheduling units, where each of the plurality of vehicle scheduling units are comprised in a respective vehicle, an autonomous driving time in which the respective vehicle will be in an autonomous driving mode. The multi-user scheduling unit further comprises a scheduling unit configured to store the received autonomous driving times in a central memory unit. The scheduling unit is further configured to schedule a video conference call for at least one respective vehicle based on a calling request and any information related to participants for the video conference call that are situated in respective vehicles, where the information is retrieved from the central memory unit. The multi-user scheduling unit further comprises a transmitting unit configured to send a result of the scheduling to all participants for the video conference call.

According to some of the example embodiments, the multi-user scheduling unit may be comprised in a cloud or central computing system. It should be appreciated that the central memory unit may be in the form of a scheduling calendar that may comprise calendar information of all users who have access to the multi-user scheduling unit.

Similarly as explained above, this example embodiment has the advantage of reducing the amount of driver interaction needed in the planning, rescheduling, rejection or acceptance of such a video conference call. Thus, driver distraction is minimized. The minimization of the driver distraction is especially beneficial when the vehicle is in a manual driving mode as the driver's attention should be directed towards the operation of the vehicle.

According to some of the example embodiments, the receiving unit is further configured to receive, from the plurality of vehicle scheduling units, a time and a date of a scheduled video conference where a respective vehicle is a participant. The scheduling unit is further configured to store the time and date of the scheduled video conference in the central memory unit.

Thus, the receiving unit may be configured to receive different types of information, for example, any scheduled video conference calls or any other scheduled activities that will leave the driver unable to receive a video conference call request from another user. This information may be stored in the central memory unit, which may be in the form of a central scheduling calendar comprising scheduled events of all the users. An example advantage of receiving such information is that the central memory unit will comprise up to date information. Thus, the multi-user scheduling unit may schedule the video conference call with use of this information, thereby reducing the need to interact with the driver during the scheduling.

According to some of the example embodiments, this information may be received once the user turns on the vehicle. Such information may also be received on a periodic basis or whenever the user enters a scheduled event. The frequency of when such information may be provided may be user programmable and adjustable. An example advantage of receiving the information in such a manner is the ability to provide accurate information to the multi-user scheduling unit so that any rescheduling may be performed efficiently and with minimal distraction on the driver.

According to some of the example embodiments, the scheduling unit is further configured to schedule the video conference call based on a calendar of at least one participant for the video conference.

It should be appreciated that any information from the calendar of at least one participant may be obtained from the multi-user scheduling based on information previously received from the unit (as described above). It should also be appreciated that the multi-user scheduling unit may have access to the calendars of the individual users who may be participants of the call. It should further be appreciated that any information obtained from the calendar need not be limited to scheduled video conferences. The calendar may comprise information related to any events the user may have scheduled. An example advantage of such an example embodiment is that the multi-scheduling unit may have accurate information about the participants in the video conference call. Therefore, if a rescheduling of the call is needed, the multi-user scheduling unit may do so with no or minimal interaction from the participants of the video conference call.

According to some of the example embodiments, the calling request may be a request received from at least one participant for an incoming or outgoing video conference call, or the calling request may be based on a scheduled conference call comprised in a calendar of at least one participant.

According to some of the example embodiments, the receiving unit may be further configured to receive an updated autonomous driving time from a respective vehicle whose driving route has been altered. The scheduling unit may be further configured to store the updated autonomous driving time in the central memory unit.

Such an example embodiment has the advantage of being able to provide current and updated information. Thus, the multi-user scheduling unit may more effectively schedule any video conference calls with minimal driver distraction.

Some of the example embodiments are directed towards a computer readable medium comprising program instructions for scheduling a video conference call for at least one autonomous vehicle. The execution of the program instructions by one or more processors of a computer system causes the one or more processors to carry out the steps of receiving, from a plurality of vehicle scheduling units, where each of the plurality of vehicle scheduling units are comprised in a respective vehicle, an autonomous driving time in which the respective vehicle will be in an autonomous driving mode. The steps also comprise storing the received autonomous driving times in a central memory unit. The steps further comprise scheduling a video conference call for at least one respective vehicle based on a calling request and the autonomous driving time of all participants for the video conference call which are situated in respective vehicles. The steps also comprise transmitting a result of the scheduling to all participants for the video conference call.

As described above, this example embodiment has the advantage of reducing the amount of driver interaction needed in the planning, rescheduling, rejection or acceptance of such a video conference call. Thus, driver distraction is minimized. The minimization of the driver distraction is especially beneficial when the vehicle is in a manual driving mode as the driver's attention should be directed towards the operation of the vehicle.

According to some of the example embodiments, the steps further comprise receiving, from the plurality of vehicle scheduling units, a time and a date of a scheduled video conference wherein a respective vehicle is a participant. The steps also comprise storing the time and date of the scheduled video conference in the central memory unit.

According to some of the example embodiments, the step of scheduling the video conference call is further based on a calendar of at least one participant for the video conference.

According to some of the example embodiments, the calling request is a request received from at least one participant for an incoming or outgoing video conference call, or the calling request is based on a scheduled conference call comprised in a calendar of at least one participant.

According to some of the example embodiments, the steps further comprise receiving an updated autonomous driving time from a respective vehicle whose driving route has been altered. The steps also comprise storing the updated autonomous driving time in the central memory unit.

Some of the example embodiments are directed towards a method for scheduling a video conference call for at least one autonomous vehicle. The method comprises receiving, from a plurality of vehicle scheduling units, where each of the plurality of vehicle scheduling units is comprised in a respective vehicle, an autonomous driving time in which the respective vehicle will be in an autonomous driving mode. The method further comprises storing the received autonomous driving times in a central memory unit. The method also comprises scheduling a video conference call for at least one respective vehicle based on a calling request and the autonomous driving time of all participants for the video conference call which are situated in respective vehicles. The method additionally comprises transmitting a result of the scheduling to all participants for the video conference call.

According to some of the example embodiments, the method may further comprise receiving, from the plurality of vehicle scheduling units, a time and a date of a scheduled video conference wherein a respective vehicle is a participant. The method may further comprise storing the time and date of the scheduled video conference in the central memory unit.

According to some of the example embodiments, the scheduling the video conference call based on a calendar of at least one participant for the video conference.

According to some of the example embodiments, the calling request is a request received from at least one participant for an incoming or outgoing video conference call, or the calling request is based on a scheduled conference call comprised in a calendar of at least one participant.

According to some of the example embodiments, the method further comprises receiving an updated autonomous driving time from a respective vehicle whose driving route has been altered. The method also comprises storing the updated autonomous driving time in the central memory unit.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The example embodiments presented herein are described with the use of a vehicle in the form of an automobile. It should be appreciated that the example embodiments presented herein may be applied to any form of vehicle or means of transportation comprising, for example, cars, trucks, busses and construction equipment, as well as airplanes, boats, ships, and space craft.

Autonomous driving allows an occupant of a vehicle, particularly a driver, to engage in activities that would otherwise not be possible while a vehicle is in a manual driving mode. Thus, at least one example of some of the exemplary embodiments described herein is to provide a system in which a driver and/or passenger of a vehicle may schedule activities during an autonomous driving mode that may not necessarily be possible during a manual driving mode.

Figure 1:
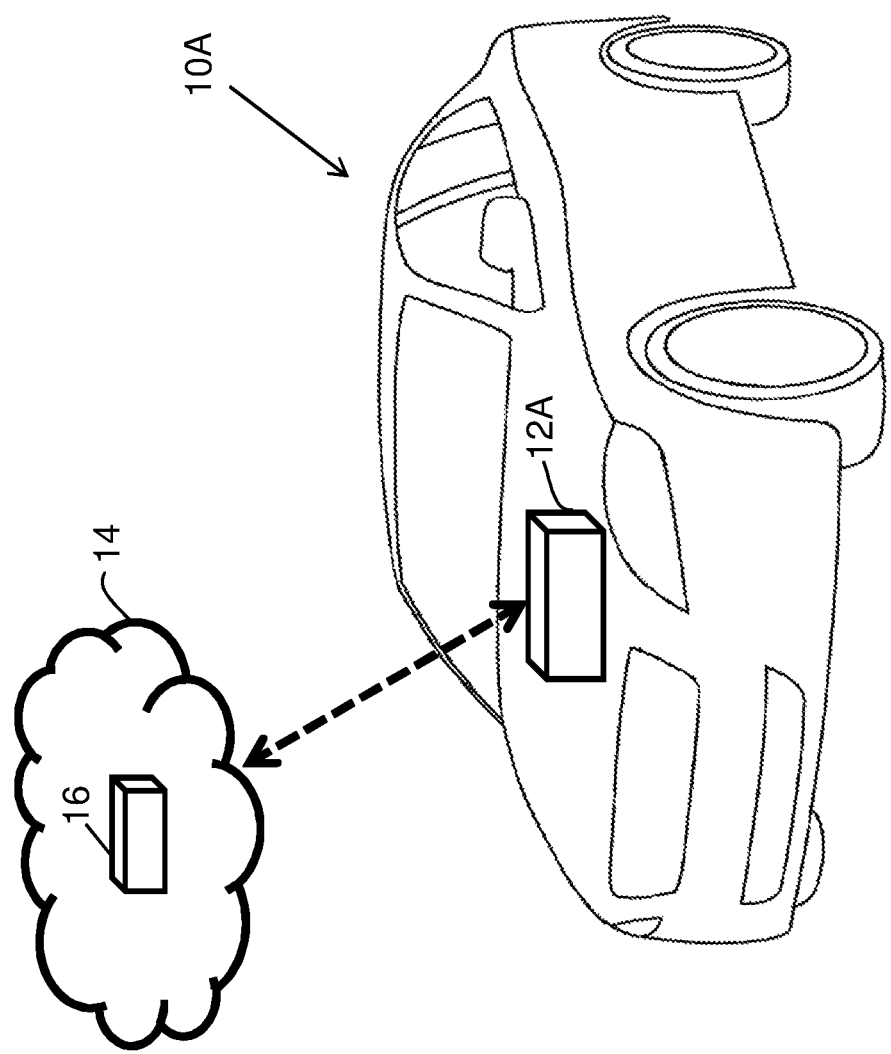
FIGS. 1 and 2 are illustrated examples of a system for scheduling a video conference call for autonomous vehicles, according to some of the example embodiments.

The example embodiments presented herein are directed towards a system, and corresponding, method for scheduling a video conference when a vehicle is in an autonomous driving mode. FIG. 1 illustrates a system for scheduling a video conference call according to some of the example embodiments. As shown in FIG. 1, a vehicle 10A comprises a vehicle scheduling unit 12A. The vehicle scheduling unit 12A may be located anywhere within the vehicle 10A. The vehicle scheduling unit may be any suitable type of computation unit, for example a microprocessor, digital signal processor (DSP), field programmable gate array (FPGA), or application specific integrated circuit (ASIC), or any other form of circuitry. Where the scheduling unit includes a programmable device such as one or more processors, the scheduling unit may also include a memory or storage for storing computer executable program code or instructions that are executable by one or more processors of a computer system for controlling operation thereof and/or for use in performing the particular algorithms represented by the functions and/or operations described herein.

The vehicle scheduling unit 12A is configured to estimate an autonomous driving time of the vehicle 10A. The estimation may be based on a planned driving route and/or any events which may be scheduled in the driver's personal calendar. According to some of the example embodiments, the vehicle scheduling unit 12A may have access to the driver's personal calendar by, for example, the calendar being synced with data comprised in the vehicle scheduling unit 12A once the driver enters the vehicle or when the driver uploads his or her personal calendar. According to some of the example embodiments, the contents of the driver's personal calendar may also be uploaded to the vehicle scheduling unit 12A whenever the driver's mobile phone is connected to a power source within the vehicle. It should be appreciated that the driver's personal calendar may also be uploaded to the vehicle scheduling unit 12A may any other means known in the art. It should be appreciated that the vehicle scheduling unit 12A may also have access to any other type of information, for example, information related to a driving history of the vehicle, a contact list of the driver, etc.

The system of FIG. 1 may also comprise a multi-user scheduling unit 16 which may be located in a centralized data network 14 also known as cloud computing. The multi-user scheduling unit 16 may be in communication with the vehicle scheduling unit 12A. The vehicle scheduling unit 12A may send information to the multi-user scheduling unit 16. Examples of information which may be sent are the estimated autonomous driving time of the vehicle 10A, any information comprised in the driver's calendar, information related to a driving history of the vehicle, a contact list of the driver, etc. The multi-user scheduling unit 16 may utilize this information for scheduling a video conference call while the vehicle is in an autonomous driving mode.

Figure 2:
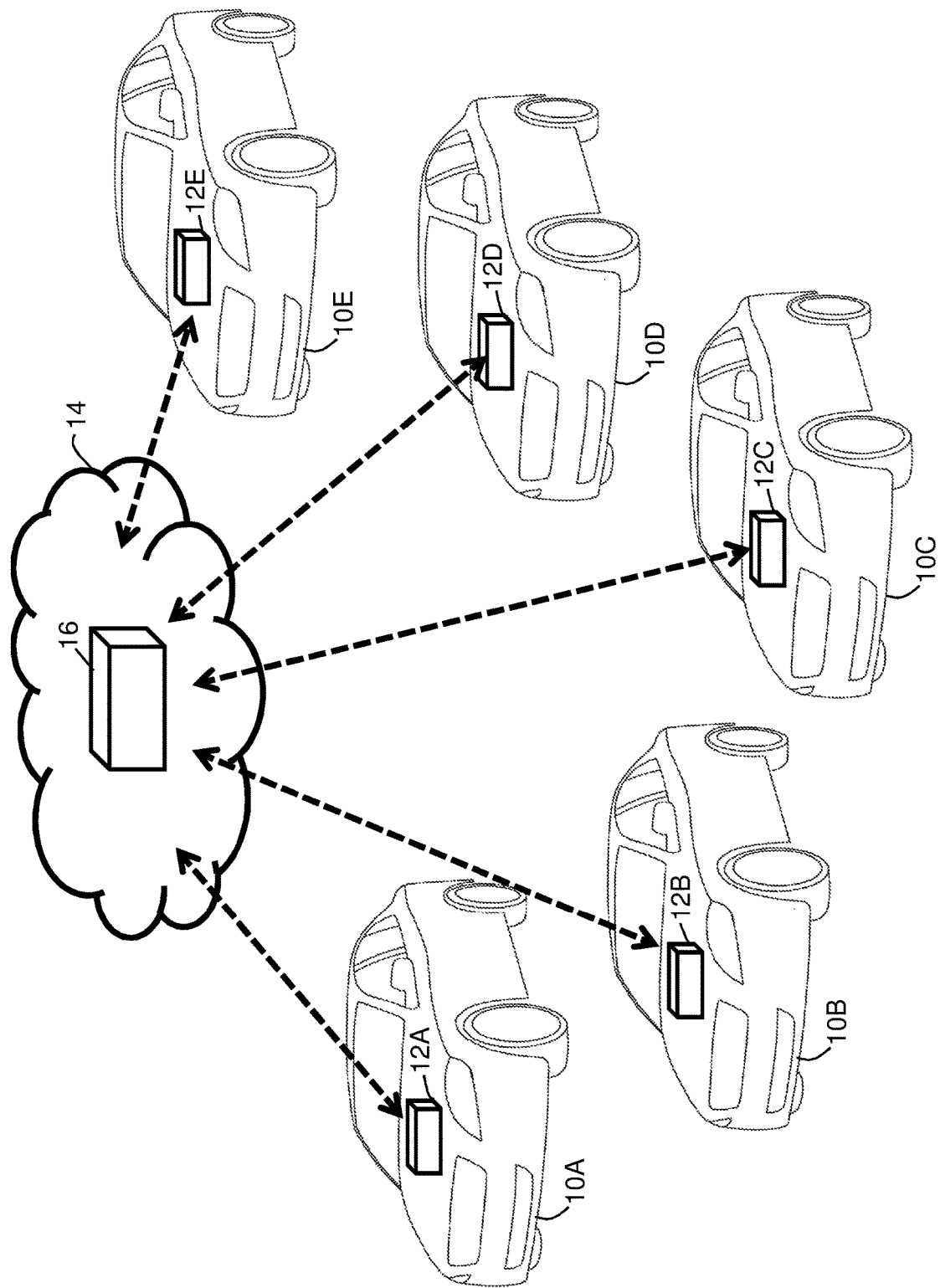

FIG. 2 illustrates a further example of a system for scheduling video conference calls, according to some of the example embodiments. As shown in FIG. 2, a plurality of vehicles 10A-10E are provided, where each vehicle 10A-10E comprises a vehicle scheduling unit 12A-12E, respectively. Each of the vehicle scheduling units 12A-12E may operation in the same manner as described in relation to FIG. 1. The multi-user scheduling unit 16 may be in communication with each of the vehicle scheduling units 12A-12E. Thus, the multi-user scheduling unit 16 may schedule a video conference call for any of the vehicles 10A-10E with the use of information provided by any of the vehicle scheduling units 12A-12E.

Figure 3:
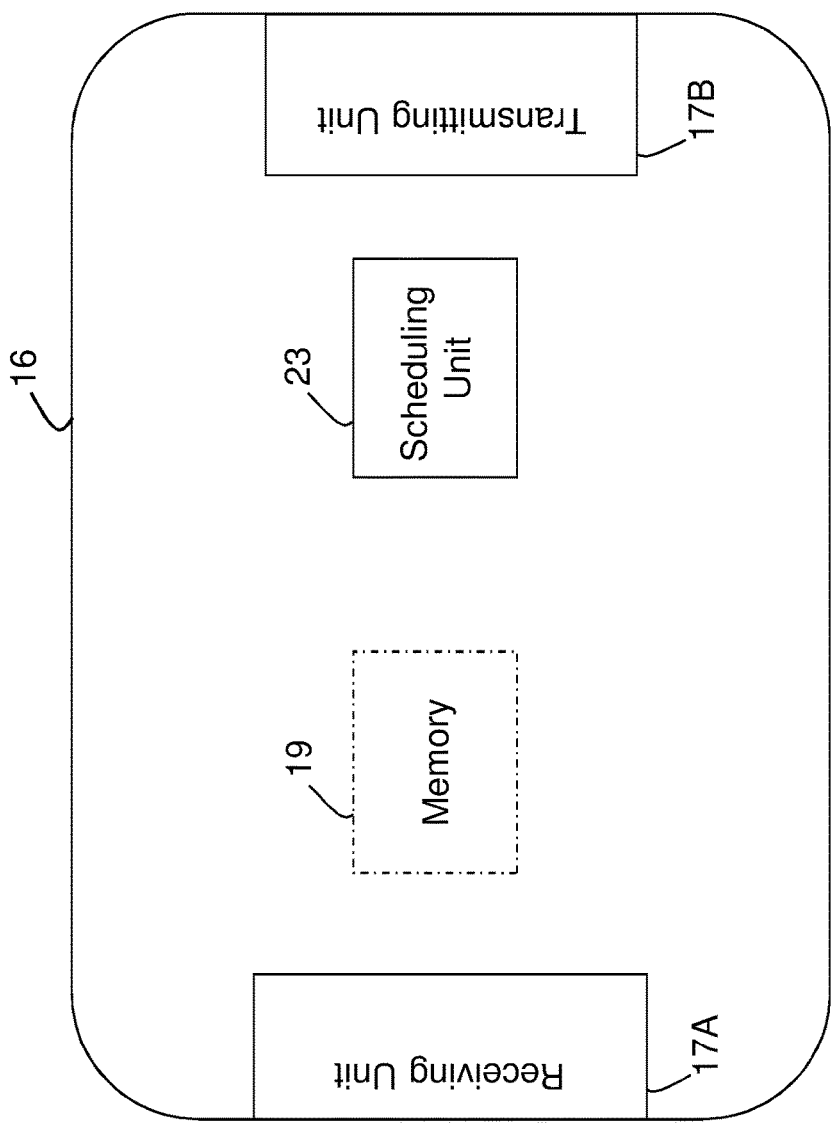
FIG. 3 is an example configuration of a multi-user scheduling unit, according to some of the example embodiments.

FIG. 3 illustrates an example configuration of a multi-user scheduling unit 16. The multi-user scheduling unit may perform the example embodiments described herein. The multi-user scheduling unit may comprise radio circuitry, a communication port or a communications module. Specifically, the multi-user scheduling unit 16 may comprise a receiving unit 17A or a transmitting unit 17B that may be configured to receive and/or transmit scheduling related information, instructions, and/or messages. It should be appreciated that the receiving unit 17A or the transmitting unit 17B may be comprised as any number of transceivers, receivers, and/or transmitters, or any number of transceiving, receiving, and/or transmitting units, modules or circuitry known in the art. It should further be appreciated that the receiving unit 17A and/or the transmitting unit 17B may be in the form of any input or output communications port known in the art.

The multi-user scheduling unit may also comprise a scheduling unit or circuitry 23, which may be configured to provide video conference scheduling as described herein. The scheduling unit 23 may be any suitable type of computation unit, for example, a microprocessor, digital signal processor (DSP), field programmable gate array (FPGA), or application specific integrated circuit (ASIC), or any other form of circuitry or module. The multi-user scheduling unit 16 may further comprise a memory unit or circuitry 19 which may be any suitable type of computer readable memory and may be of volatile and/or non-volatile type. The memory unit 19 may be configured to store received, transmitted, and/or data related to video conference call scheduling, and/or executable program instructions or any other form of information described herein. The scheduling unit may also include stored computer executable program code or instructions that are executable by one or more processors of a computer system for controlling operation thereof and/or for use in performing the particular algorithms represented by the functions and/or operations described herein.

Figure 4:
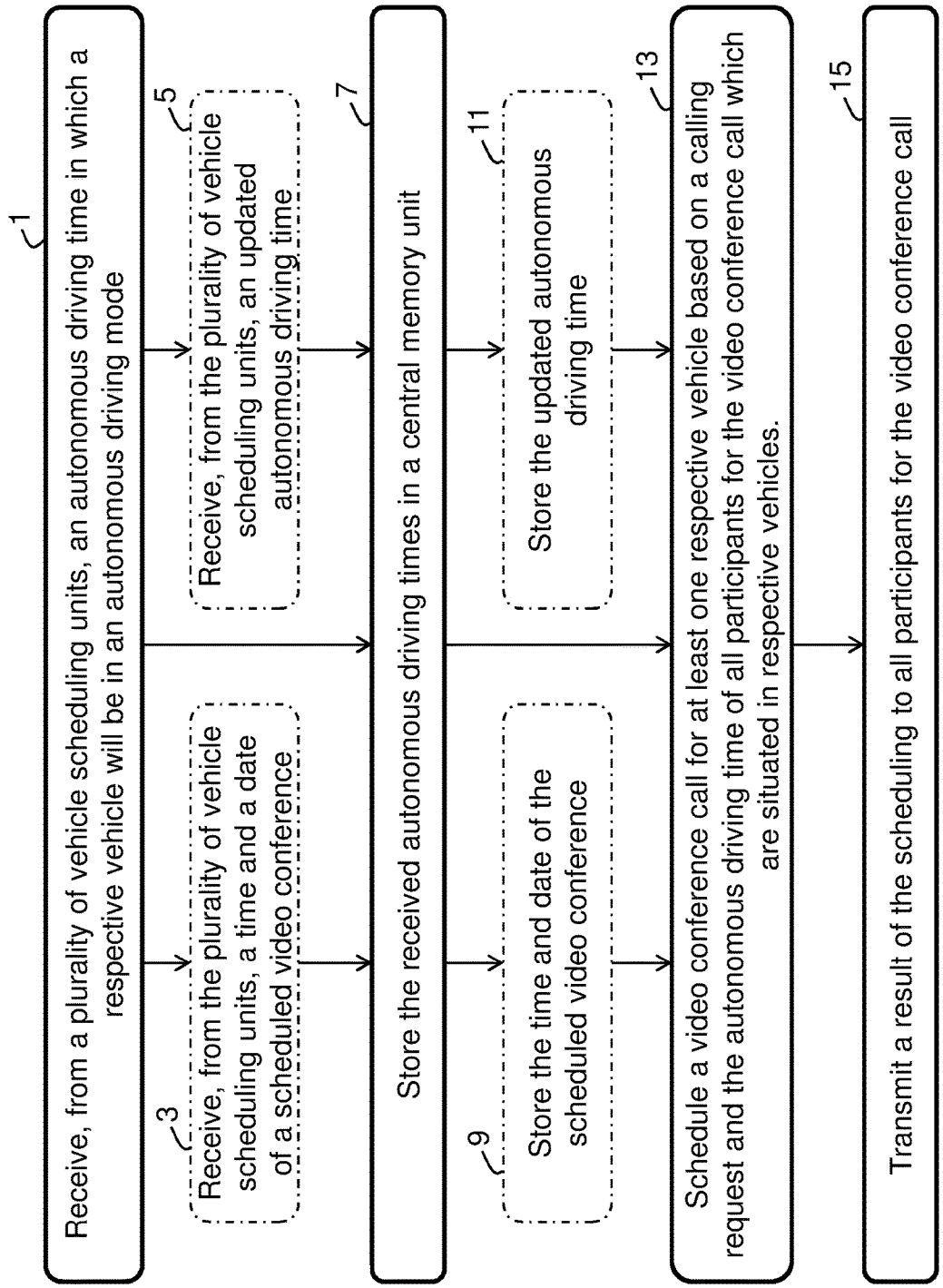
FIG. 4 is a flow diagram of example operations which may be taken by the multi-user scheduling unit of FIGS. 1-3, according to some of the example embodiments.

FIG. 4 is a flow diagram depicting example operations that may be taken by a multi-user scheduling unit for scheduling a video conference as described herein. It should also be appreciated that FIG. 4 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Operation 1

The multi-user scheduling unit 16 is configured to receive 1, from a plurality of vehicle scheduling units 12A-12E, an autonomous driving time. The plurality of vehicle scheduling units 12A-12E are comprised within a respective vehicle 10A-10E. The autonomous driving time is a time period in which the respective vehicle 10A-10E will be in an autonomous driving mode. The receiving unit 17A is configured to receive, from the plurality of vehicle scheduling units 12A-12E, the autonomous driving time of the respective vehicles 10A-10E.

As illustrated in FIG. 2, the multi-user scheduling unit 16 may receive such information from a number of vehicles 10A-10E, each vehicle comprising a vehicle scheduling unit 12A-12E. It should be appreciated that the autonomous driving time may be an estimated time based on a planned route, a scheduled calendar events, a driving history associated with the vehicle, etc.

Example Operation 3

According to some of the example embodiments, the multi-user scheduling unit 16 may be further configured to receive 3, from the plurality of vehicle scheduling units 12A-12E, a time and date of a scheduled video conference call, where the respective vehicles 10A-10E comprise a participant of the video conference call. The receiving unit 17A may be configured to receive, from the plurality of vehicle scheduling units 12A-12E, the time and date of a scheduled video conference call.

Thus, it should be appreciated the multi-user scheduling unit 16 may also receive information such as the time and date of a scheduled video conference call. The vehicle scheduling units may retrieve such information from a vehicle occupant's personal calendar. According to some of the example embodiments, the multi-user scheduling unit 16 may be configured to access a personal calendar associated with each respective vehicle 10A-10E. Such calendar information may be used in scheduling the video conference call.

Example Operation 5

According to some of the example embodiments, the multi-user scheduling unit 16 may be further configured to receive 5, from the plurality of vehicle scheduling units 12A-12E, an updated autonomous driving time from a respective vehicle 10A-10E whose driving route has been altered. The receiving unit 17A may be configured to receive, from the plurality of vehicle scheduling units 12A-12E, the updated autonomous driving time from the respective vehicle 10A-10E whose driving route has been altered.

Receiving such updated information has the advantage that the multi-user scheduling unit 16 may dynamically and accurately schedule a video conference call for multiple participants.

Operation 7

The multi-user scheduling unit 16 is further configured to store 7, the received autonomous driving times in a central memory unit. The scheduling unit 23 is configured to store the received driving times in a central memory unit.

According to some of the example embodiments, the central memory unit may be located within the multi-user scheduling unit 16, for example memory 19. Alternatively, the central memory unit may be located externally from the multi-user scheduling unit 16.

Example Operation 9

According to some of the example embodiments, the multi-user scheduling unit 16 may also be configured to store the received, as described in example operation 3, time and date of the scheduled video conference call in the central memory unit. The scheduling unit 23 may be configured to store the received time and date of the scheduled video conference call in the central memory unit.

It should be appreciated that the central memory unit may be in the form of a central scheduling calendar comprising scheduled events and/or autonomous driving times of all the users. An advantage of storing such data is that the same data may be used for the scheduling of other video conference calls where the received data may be associated with a vehicle in which a participant of the conference call is situated.

Example Operation 11

According to some of the example embodiments, the multi-user scheduling unit 16 may be configured to store the updated autonomous driving time, as described in example operation 5, in the central memory unit. The scheduling unit 23 is configured to store the updated autonomous driving time in the central memory unit.

It should be appreciated that the central memory unit may be in the form of a central scheduling calendar comprising scheduled events and/or autonomous driving times of all the users. The advantage of storing the updated information in a central location is that such information may be used for any participant wishing to schedule a video conference call.

Operation 13

The multi-user scheduling unit 16 is also configured to schedule a video conference call for at least one respective vehicle based on a calling request and the autonomous driving time of all participants for the video conference call that are situated in respective vehicles. The scheduling unit is configured to schedule the video conference call for the at least one respective vehicle based on the calling request and the autonomous driving time of all participants for the video conference call which are situated in respective vehicles.

It should be appreciated that a calling request may be an incoming or an outing request from any of the participants of the video conference call. It should be appreciated that the calling request may also be a scheduled video conference call on one of the participant's calendar. It should further be appreciated that not all participants need to be situated in a vehicle, for example, at least one participant may be situated in an office or home setting or may be using a mobile device.

It should further be appreciated that the scheduling may also be based on any information described herein. For example, any scheduled video conference calls or any other scheduled activities that will leave the driver unable to receive a video conference call request from another user. Furthermore, any information described herein may be provided on a periodic basis or whenever the user enters a scheduled event. The frequency of when such information may be provided may be user programmable and adjustable. An example advantage of receiving the information in such a manner is the ability to provide accurate information to the multi-user scheduling unit so that any rescheduling may be performed efficiently and with minimal interaction required of the driver. Furthermore, scheduling based on any of the information described herein, taken individually or in any combination, has the advantage of scheduling video conference calls with minimal interaction required by a driver or occupant of the vehicle.

Operation 15

The multi-user scheduling unit 16 is also configured to transmit 15 a result of the scheduling to all participants for the video conference call. The transmitting unit 17B is configured to transmit the result of the scheduling to all the participants for the video conference call. It should be appreciated that the result may be to continue with a scheduled call, to reschedule or cancel a scheduled call or a request for a video conference call.

Figure 5A:
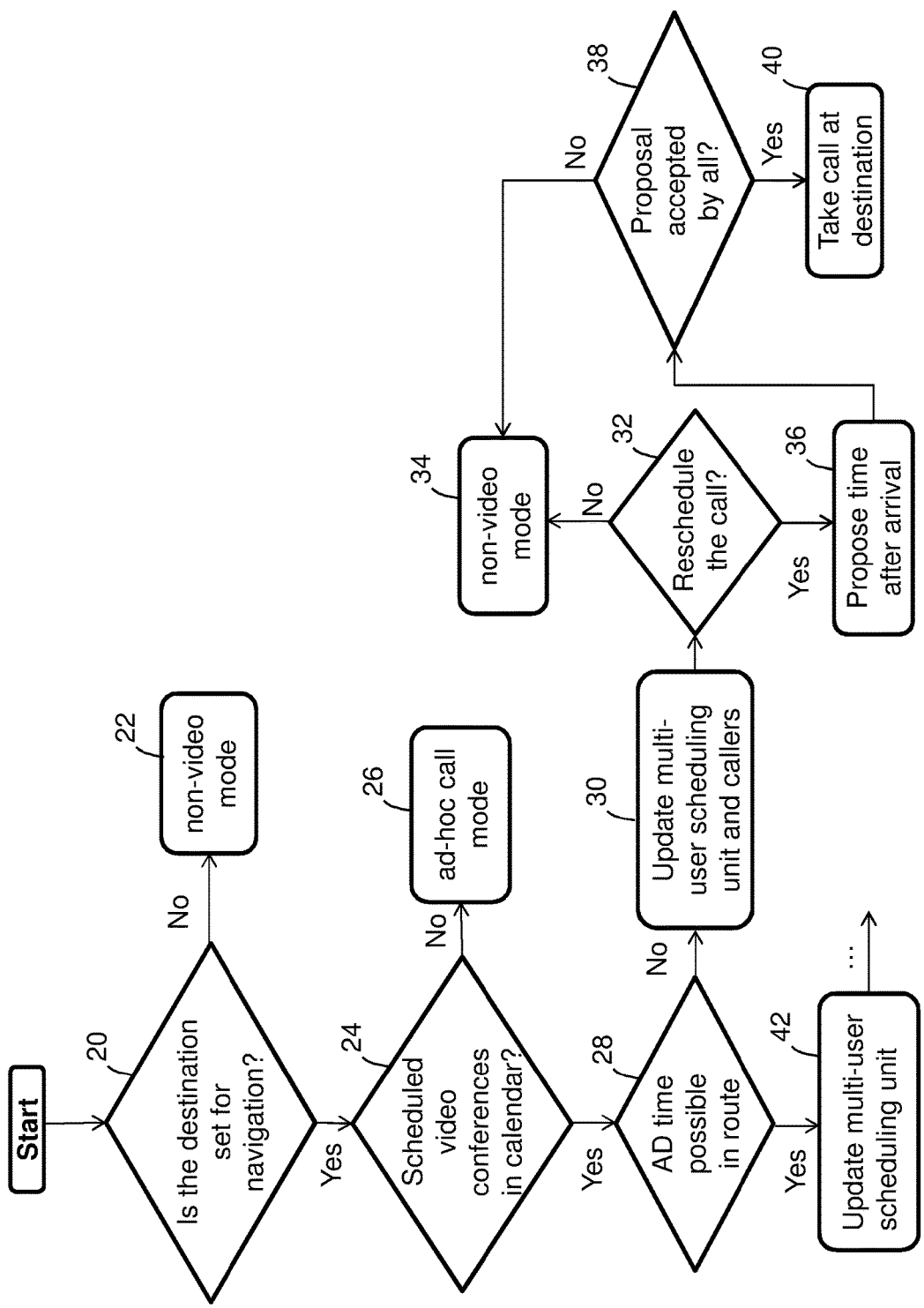
FIGS. 5A, 5B and 6 is a working example of the system illustrated in FIGS. 1 and 2, according to some of the example embodiments.
Figure 5B:
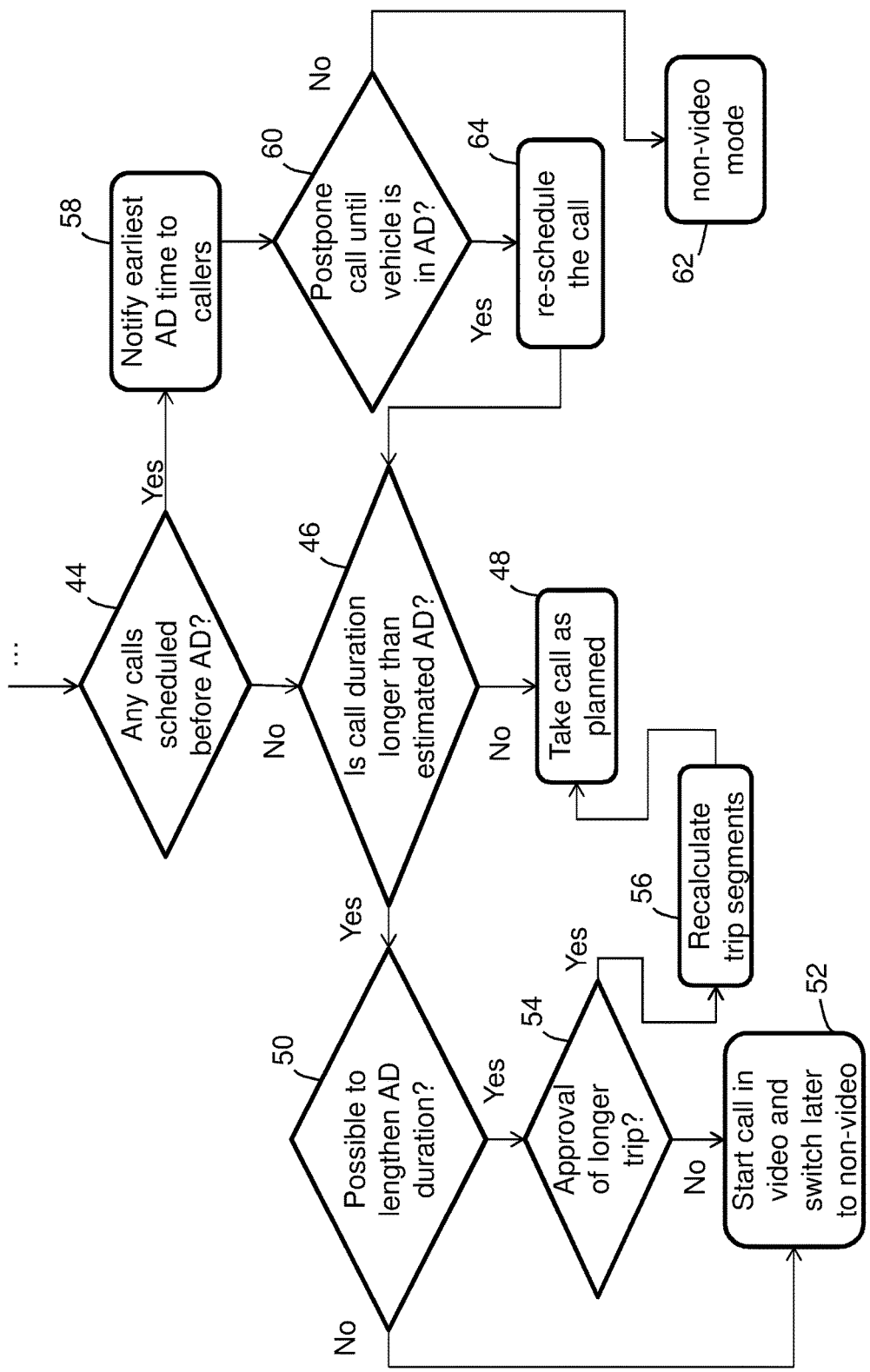

FIGS. 5A and 5B illustrate a working example comprising detailed flow diagram of example operational steps that may be taken by the multi-user scheduling unit 16 and the various vehicle scheduling units 12A-12E. It should be appreciated that FIGS. 5A and 5B are merely an example and that not all the steps need be performed nor do the steps need to be performed in the order illustrated.

When a vehicle scheduling unit 12A-12E detects a request for a video conference call, which may be incoming or outgoing, first, an evaluation is made is to whether or not a destination is set for navigation 20. If a route is planned, it is possible to determine beforehand how much time the vehicle is expected to be in an autonomous driving time, which would enable the driver to participate in a video conference call as the driver will not need to maintain control of the vehicle.

If the vehicle does not have a planned route or no destination is set for navigation, the call is accepted in a non-video mode 22. For example, the driver may participate in the call via speaker phone without the use of a video.

If a destination is set for navigation, an evaluation may be made if the current call request was previously scheduled 24. Such an evaluation may be made by reviewing a scheduling calendar of the driver. Both the multi-user scheduling unit 16 and a respective vehicle scheduling unit 12A-12E may be configured to review the contacts of an individual driver's scheduling calendar. It should be appreciated that the various scheduling units 12A-12E may be configured to periodically send information to the multi-user scheduling unit 16. Thus, the multi-user scheduling unit may comprise information regarding scheduled events for a number of users.

Figure 6:
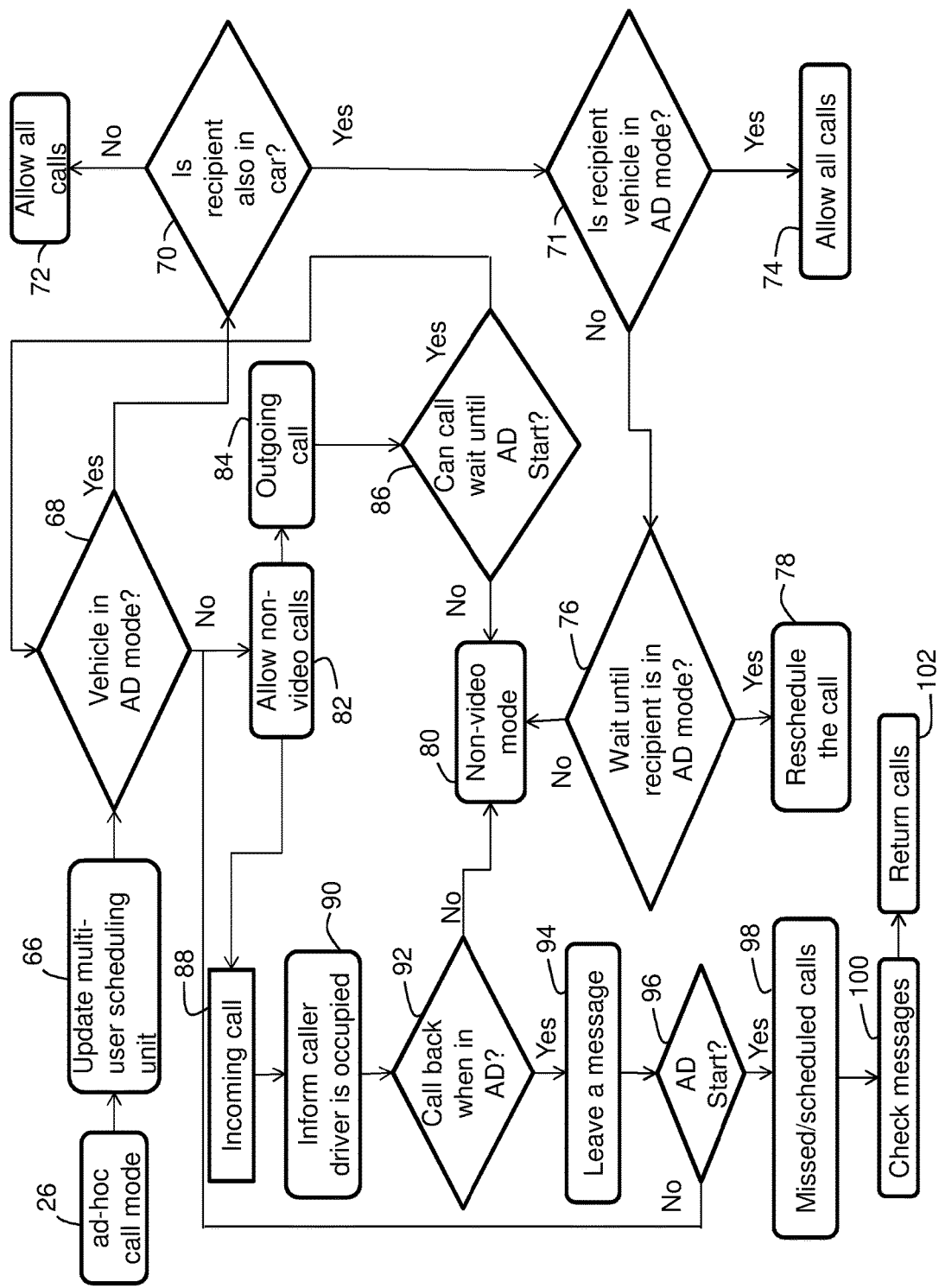

If the current call is not scheduled, the call will be considered an ad-hoc communication 26, which will be further described in FIG. 6. If the call is scheduled, an evaluation is made as to whether there is any autonomous driving time estimated in the planned route 28. If there is no autonomous driving time estimated in the planned route, a message is sent to the multi-user scheduling unit 16 and any other participants of the call that the call may not be had as a video conference 30.

If it is determined that there will be autonomous driving during the planned route, an estimated start of the autonomous driving time and an estimated duration of the autonomous driving is sent to the multi-user scheduling unit 42. Thereafter, an evaluation is made as to whether any calls are scheduled before the estimated start of the autonomous driving time 44.

If there are no calls scheduled before the start of the estimated autonomous driving time, an evaluation is made as to whether the scheduled call is longer than the estimated duration of the autonomous driving time 46. If the scheduled call is no longer than the estimated duration of the autonomous driving time, the call is scheduled as planned 48.

If the scheduled call is longer than the estimated duration of the autonomous driving time, an evaluation is made as to whether it is possible to lengthen the duration of the autonomous driving time 50. According to some of the example embodiments, the duration of the autonomous driving time may be lengthened, for example, by choosing a different driving route which features a longer autonomous driving segment or by lowering the speed of the vehicle in the planned autonomous driving segment.

If it is not possible to lengthen the duration of the autonomous driving time, the call may be started as a video conference call and thereafter be switched to an audio call once the autonomous driving has ended 52. If it is possible to lengthen the duration of the autonomous driving time, a request to lengthen the autonomous driving time may be sent to the driver 54.

According to some of the example embodiments, the request may comprise the options of choosing a different driving route which features a longer autonomous driving segment or lowering the speed of the vehicle in the planned autonomous driving segment.

If the driver approves the request, a recalculation of the affect route segments may be made 56. Thereafter, the video conference call may be taken as originally scheduled. If the driver does not approve the request to lengthen the duration of the autonomous driving time, the call may be started as a video conference call and thereafter be switched to an audio call once the autonomous driving has ended 52.

If there are video conference calls scheduled before the estimated start of the autonomous driving mode, a notification may be sent to the participants of the call of the earliest possible autonomous driving time of all the participants 58. Thereafter, an evaluation may be made as to whether or not to postpone the video conference call until all participating vehicles are in an autonomous driving mode 60. If it is not possible to postpone the video conference call, the call may be taken in a non-video mode, for example, using audio only 62. If it is possible to postpone the video conference call, the multi-user scheduling unit may rescheduled the video conference call with information from any participants the multi-user scheduling unit has available 64. Thereafter, another evaluation is made as to whether the re-scheduled call duration is longer that the estimated duration of the autonomous driving time 46, as explained above.

FIG. 6 illustrates a working example comprising a flow diagram of example operational steps that may be taken if an outgoing or incoming call request is not scheduled or is an ad-hoc call request. Upon the start of an ad-hoc mode 26, the estimated starting time of the autonomous driving mode and the estimated duration of the autonomous driving time is continuously sent to the multi-user scheduling unit 66. According to some of the example embodiments, this information, as well as any other available information related to the driver or scheduled activities, may be sent in a periodic manner, upon request, etc.

Thereafter, an evaluation is made as to whether or the vehicle making the outgoing call request or receiving such a request is currently in an autonomous driving mode 68. If the vehicle is in an autonomous driving mode, an evaluation is made as to whether or not the recipients of the call are in the respective vehicles 70. According to some of the example embodiments, the multi-user scheduling unit may be able to determine if the vehicle scheduling units associated with the vehicles of each recipient of the video conference call is active. If any of the respective vehicle scheduling units are active, each vehicle scheduling unit may present a questions, for example via a touch screen, to inquire if the recipient of the video conference call is present in the vehicle.

If it is determined that a recipient is not in a vehicle, the call may be allowed, for example, via the recipient's mobile, home or office calling facilities. If it is determined that the recipient of the call is in a vehicle, an evaluation is made is to whether or not the respective vehicle, or the vehicle in which the recipient is located, is in an autonomous driving mode 72. If it is determined that the respective vehicle is in an autonomous driving mode, the ad-hoc call will be allowed in video mode 74.

If it is determined that the respective vehicle is not in an autonomous driving mode, an evaluation may be made as to whether or not the recipients of the call may wait until a respective vehicle is in an autonomous driving mode 76. According to some of the example embodiments, this evaluation may be made by presenting a question to the recipient in the vehicle, for example, via a touch screen. Evaluation 76 may also be made based on any number of preconfigured rules. For example, a recipient may have a list of participants whose calls are to always be allowed. Such preconfigured rules may also be based on, for example, a time, date, current location, etc.

If it determined the recipient is able to wait until a respective vehicle is in an autonomous driving mode, the multi-user scheduler 16 will reschedule the call 78 as described herein. If it is determined the recipient is not able to reschedule the call, the call will be allowed in a non-video mode 80.

If it is determined that the participant placing or receiving the call request is not in an autonomous mode (as described in evaluation 68), call will be placed in a non-video mode 82. If it is determined that the call request is an outgoing call (evaluation 84), a further evaluation will be made as to whether or not the call may be rescheduled until after the participant is in an autonomous driving mode 86. Evaluation 86 may be determined by, for example, presenting a question to the participant and/or based on any number of preconfigured rules. If it is determined that the call is able to be rescheduled, a further evaluation will be made to see when the vehicle is in an autonomous driving mode 68. If the call may not be rescheduled, the call will be allowed in a non-video mode 80.

If it is determined that the call request is an incoming call (evaluation 88), the originating caller will be informed that the recipient is not available until the recipient's respective vehicle is in an autonomous driving mode 90. Thereafter, the originating caller will be presented with a question as to whether the recipient may call the originating caller when the recipient is in an autonomous driving mode 92.

If the originating caller indicates that he or she does not want to be called back, the call will provide in a non-video mode 80. If the originating caller indicates that he or she may be called back, the originating caller will be asked to leave a message for the recipient 94. Thereafter, an evaluation is made as to when the recipient enters an autonomous driving mode 96. Once it is detected that the recipient is in an autonomous driving mode, the recipient will be shown a list of scheduled and/or missed calls 98. The recipient will also be given the opportunity to check any messages 100. Thereafter, the recipient will be given the opportunity to may any outgoing video conference call requests 102.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for scheduling a video conference call for at least one autonomous vehicle, the system comprising:
    a plurality of vehicle scheduling units, each of the plurality of vehicle scheduling units for use in a respective vehicle, each of the plurality of vehicle scheduling units configured to estimate an autonomous driving time in which the respective vehicle will be in an autonomous driving mode such that an occupant can participate in a video conference call, wherein the autonomous driving time estimate is based on a planned driving route of the vehicle, a personal events calendar of the occupant, and a driving history of the vehicle;
    each of the plurality of vehicle scheduling units further configured to send the respective autonomous driving time to a multi-user scheduling unit;
    the multi-user scheduling unit configured to receive the autonomous driving time from each of the plurality of vehicle scheduling units and store the received autonomous driving time in a central memory unit; and
    the multi-user scheduling unit further configured to determine a time for a video conference for at least one vehicle associated with a respective vehicle scheduling unit based on a calling request, the estimated autonomous driving time, and information related to participants for the video conference call which are situated in respective vehicles, the information retrieved from the central memory unit, wherein the calling request is configured to be accepted in a non-video mode when a respective vehicle is in a manual driving mode, such that distraction of a driver of the at least one respective vehicle is minimized while the vehicle is in the manual driving mode, the multi-user scheduling unit being further configured to detect a transition of the at least one respective vehicle to the autonomous driving mode and, in response, to enable the conference call to be switched from the non-video mode to a video mode.

2. A multi-user scheduling unit for scheduling a video conference call for at least one autonomous vehicle, the multi-user scheduling unit comprising:
    a receiving unit configured to receive, from each of a plurality of vehicle scheduling units, each of the plurality of vehicle scheduling units in a respective vehicle, an estimated autonomous driving time in which the respective vehicle will be in an autonomous driving mode such that an occupant can participate in a video conference call, wherein the autonomous driving time estimate is based on a planned driving route of the vehicle, a personal events calendar of the occupant, and a driving history of the vehicle;
    a scheduling unit configured to store the received autonomous driving times in a central memory unit;
    the scheduling unit further configured to schedule a video conference call for at least one respective vehicle based on a calling request, the estimated autonomous driving time, and information related to participants for the video conference call which are situated in respective vehicles, the information retrieved from the central memory unit; and
    a transmitting unit configured to transmit a request to the occupant of at least one respective vehicle to lengthen the duration of autonomous driving time when a scheduled duration of the video conference call exceeds the estimated autonomous driving time of the respective vehicle, the transmitting unit further configured to send a result of the scheduling to all participants for the video conference call.

3. The multi-user scheduling unit of claim 2 wherein the receiving unit is further configured to receive, from the plurality of vehicle scheduling units, a time and a date of a scheduled video conference wherein a respective vehicle comprises a participant, and the scheduling unit is further configured to store the time and date of the scheduled video conference in the central memory unit.

4. The multi-user scheduling unit of claim 2 wherein the scheduling unit is further configured to schedule the video conference call based on a calendar of at least one participant for the video conference.

5. The multi-user scheduling unit of claim 2 wherein the calling request is a request received from at least one participant for an incoming or outgoing video conference call, or the calling request is based on a scheduled conference call comprised in a calendar of at least one participant.

6. The multi-user scheduling unit of claim 2 wherein the receiving unit is further configured to receive an updated autonomous driving time from a respective vehicle whose driving route has been altered in response to an acceptance of the request to lengthen the duration of autonomous driving time, and the scheduling unit is further configured to store the updated autonomous driving time in the central memory unit.

7. A non-transitory computer readable medium having stored program instructions for scheduling a video conference call for at least one autonomous vehicle, the instructions for execution by one or more processors of a computer system and comprising instructions for:
receiving, from each of a plurality of vehicle scheduling units, each of the plurality of vehicle scheduling units in a respective vehicle, an estimated autonomous driving time in which the respective vehicle will be in an autonomous driving mode such that an occupant can participate in a video conference call, wherein the autonomous driving time estimate is based on a planned driving route of the vehicle, a personal events calendar of the occupant, and a driving history of the vehicle;
storing the received autonomous driving times in a central memory unit;
scheduling a video conference call for at least one respective vehicle based on a calling request, the estimated autonomous driving time, and the autonomous driving time of all participants for the video conference call which are situated in respective vehicles, wherein the conference call is configured to be accepted in a non-video mode when there is no autonomous driving time for the planned driving route of a respective vehicle during the video conference call as scheduled and the video conference call is not rescheduled for a different time, such that distraction of a driver of the at least one respective vehicle is minimized while the vehicle is in a manual driving mode; and
transmitting a result of the scheduling to all participants for the video conference call.

8. The computer readable medium of claim 7 wherein the program instructions further comprise instructions for:
receiving, from the plurality of vehicle scheduling units, a time and a date of a scheduled video conference wherein a respective vehicle comprises a participant; and
storing the time and date of the scheduled video conference in the central memory unit.

9. The computer readable medium of claim 7 wherein scheduling the video conference call is further based on a calendar of at least one participant for the video conference.

10. The computer readable medium of claim 7 wherein the calling request is a request received from at least one participant for an incoming or outgoing video conference call, or the calling request is based on a scheduled conference call comprised in a calendar of at least one participant.

11. The computer readable medium of claim 7 wherein the program instructions further comprise instructions for:
receiving an updated autonomous driving time from a respective vehicle whose driving route has been altered; and
storing the updated autonomous driving time in the central memory unit.

12. A method for scheduling a video conference call for at least one autonomous vehicle, the method comprising:
receiving, from each of a plurality of vehicle scheduling units, each of the plurality of vehicle scheduling units in a respective vehicle, an estimated autonomous driving time in which the respective vehicle will be in an autonomous driving mode such that an occupant can participate in a video conference call, wherein the autonomous driving time estimate is based on a planned driving route of the vehicle, a personal events calendar of the occupant, and a driving history of the vehicle;
storing the received autonomous driving times in a central memory unit;
scheduling a video conference call for at least one respective vehicle based on a calling request, the estimated autonomous driving time, and the autonomous driving time of all participants for the video conference call which are situated in respective vehicles, wherein the calling request is configured to be accepted in a non-video mode when a respective vehicle is in a manual driving mode, such that distraction of a driver of the at least one respective vehicle is minimized while the vehicle is in the manual driving mode;
transmitting a result of the scheduling to all participants for the video conference call;
detecting a transition of the at least one respective vehicle to the autonomous driving mode; and
enabling the conference call to be switched from the non-video mode to a video mode in response to detecting the transition of the at least one respective vehicle to the autonomous driving mode.

13. The method of claim 12 further comprising:
receiving, from the plurality of vehicle scheduling units, a time and a date of a scheduled video conference call wherein a respective vehicle comprises a participant; and
storing the time and date of the scheduled video conference call in the central memory unit.

14. The method of claim 12 wherein the scheduling of the video conference call is further based on a calendar of at least one participant for the video conference.

15. The method of claim 12 wherein the calling request is a request received from at least one participant for an incoming or outgoing video conference call, or the calling request is based on a scheduled conference call comprised in a calendar of at least one participant.

16. The method of claim 12 further comprising:
receiving an updated autonomous driving time from a respective vehicle whose driving route has been altered; and
storing the updated autonomous driving time in the central memory unit.

17. The multi-user scheduling unit of claim 2, wherein the scheduling unit is further configured to evaluate whether it is possible to lengthen the duration of the autonomous driving time for at least one respective vehicle, when the scheduled duration of the video conference call exceeds the estimated autonomous driving time of the respective vehicle, prior to transmitting the request to the occupant of the respective vehicle to lengthen the duration of autonomous driving time.

18. The multi-user scheduling unit of claim 17, wherein the request to lengthen the duration of autonomous driving time includes an option to choose a different driving route that features a longer autonomous driving segment.

19. The multi-user scheduling unit of claim 17, wherein the receiving unit is further configured to receive an updated autonomous driving time from the respective vehicle whose driving route has been altered by the vehicle in response to an acceptance of the request to lengthen the duration of autonomous driving time, and the scheduling unit is further configured to store the updated autonomous driving time in the central memory unit.

20. The multi-user scheduling unit of claim 17, wherein the request to lengthen the duration of autonomous driving time includes an option to lower the speed of the respective vehicle in a planned autonomous driving segment;

wherein the receiving unit is further configured to receive an updated autonomous driving time from the respective vehicle whose speed has been lowered in response to an acceptance of the request to lengthen the duration of autonomous driving time, and the scheduling unit is further configured to store the updated autonomous driving time in the central memory unit.

* * * * *